Oct. 23, 1962 E. FABBRI 3,059,392
AUTOMATIC WRAPPING MACHINE FOR SUBSTANTIALLY
ROUND FRUITS AND LIKE PRODUCTS
Filed Nov. 30, 1960 5 Sheets-Sheet 1
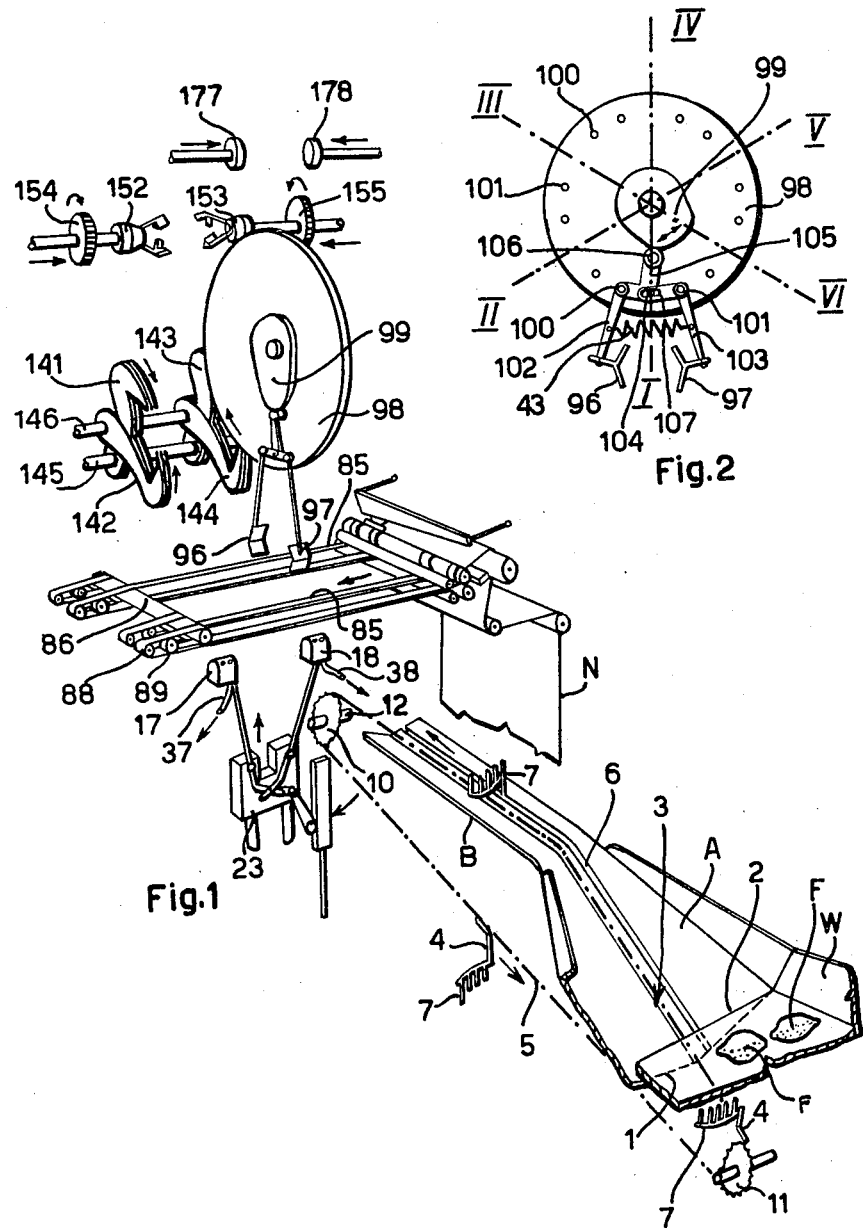
Inventor
ERMANNO FABBRI
By Murie and Sunley
Attorneys

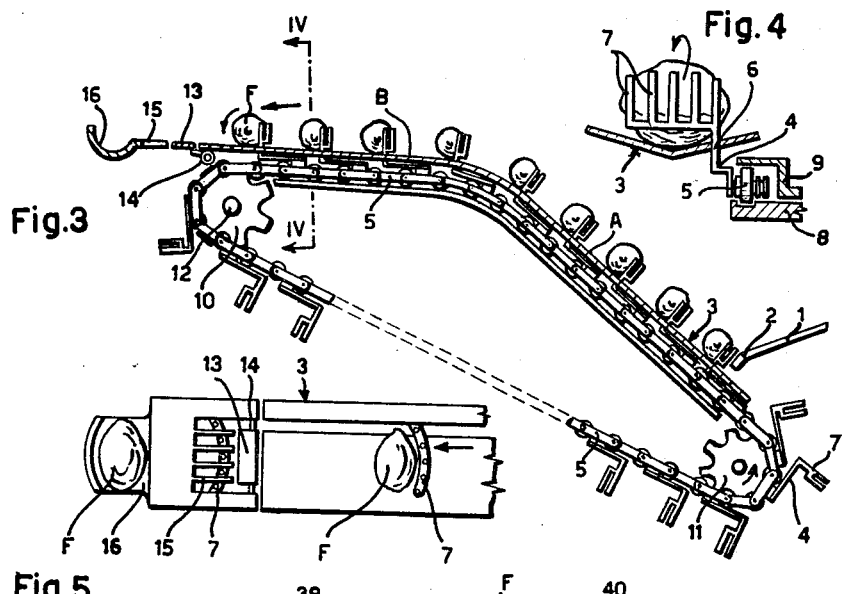

Inventor
ERMANNO FABBRI

By *Munn and Sunley*
Attorneys

United States Patent Office 3,059,392
Patented Oct. 23, 1962

3,059,392
AUTOMATIC WRAPPING MACHINE FOR SUBSTANTIALLY ROUND FRUITS AND LIKE PRODUCTS
Ermanno Fabbri, 118 Via Caselline, Vignola, Modena, Italy
Filed Nov. 30, 1960, Ser. No. 72,627
Claims priority, application Italy Sept. 17, 1960
14 Claims. (Cl. 53—227)

This invention relates to automatic wrapping machines and particularly to machines for wrapping in thin paper sheets or the like substantially round objects and particularly fruits such as citrus fruits.

It aims to provide a machine for effecting all operations, including the cutting of the wrapper sheets and the complete wrapping of the objects—which shall be referred to simply as "fruits"—mechanically, at high speed, without necessity of employing hand labor.

In the machine according to the invention the previously sized round fruits (which may be also oval or round with flattened ends), are fed in bulk, and the machine provides means to push the fruit forward one at a time into a cup-shaped receptacle from which they are seized by gripping jaws having suction nozzles for seizing a thin sheet of paper or the like, to be referred to hereinafter as the "wrapper."

The machine further provides means for cutting the wrappers to the required size from a band of wrapping material on a supply roll, means to shift the single wrappers, well spread out, in a position above and covering the fruit gripped by said gripping jaws, so as to permit seizing of the fruit, together with the wrapper having two depending laps, by a second pair of jaws. The second pair of jaws is mounted so as to be shifted stepwise and stopped in a plurality of stations, which include; a first station in which the fruits are seized by the second pair of jaws and abandoned by the first pair of jaws; a second station in which the depending wrapper laps are rolled about the fruit; a third station in which the wrapper ends are crumpled; a fourth station in which the said crumpled wrapper ends are twisted; a fifth station in which the twisted wrapper ends are sealed and a sixth station in which the second pair of jaws opens and releases the wrapped fruit.

The machine further provides means for correctly positioning the fruits, which never are perfectly spherical, so as to allow same to be seized and gripped always in the same positions, and means for keeping the fruits on their way to the first-named jaws well spaced, in order to avoid jamming of the machine.

Also the individual fruit wrappers, after they have been cut from a continuous band, are spaced from each other and from the band end and are spread out, until they are seized without risk of tearing by a suction seizing device provided at the top of the first-named pair of jaws.

Further characteristic features and the inherent advantages of the invention will be apparent from the following specification of a preferred embodiment of a wrapping machine which is shown by way of non-limiting example in the annexed drawings, in which:

FIGURE 1 is an exploded view of the most important operating device of the machine in working position;

FIGURE 2 is a front view of the disc carrying a plurality of said second-named jaw pairs, together with a jaw-opening cam;

FIGURE 3 is a diagrammatical longitudinal section of the device for arranging the fruits in correct position and conveying same spaced in a line towards the fruit-seizing position;

FIGURE 4 is a cross section on line IV—IV of the FIGURE 3;

FIGURE 5 is a top plan of the left-hand end of the device shown in FIGURE 3;

FIGURE 6 is an elevation of the said first-named jaw pair and related devices;

Figure 7:
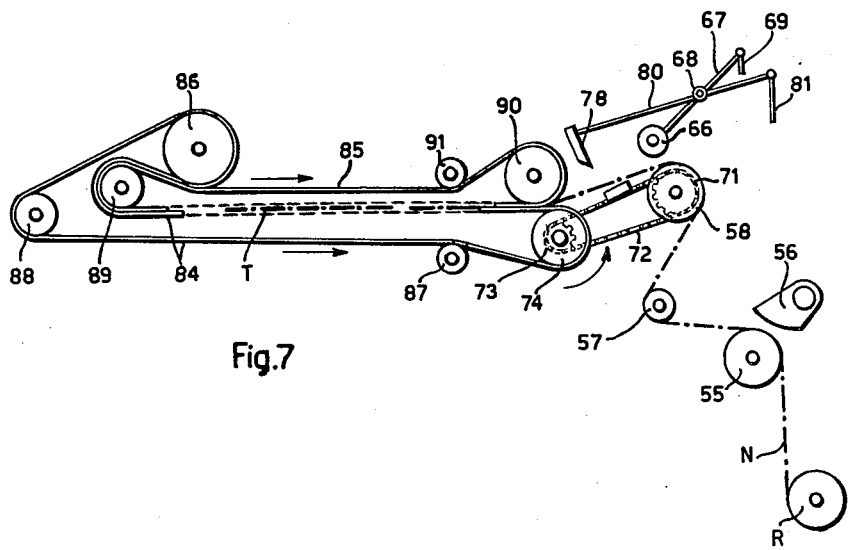
FIGURE 7 shows diagrammatically the wrapper-severing and spacing device and correlated parts.

The machine will be now described in detail with reference to the attached drawings and first explaining briefly the whole machine.

The automatic machine comprises a number of elementary devices working in timed relation for accomplishing the desired end.

These operations, or working steps, are shown diagrammatically in FIGURE 1, in which, to the purpose of avoiding confusion in the drawing, the various elementary devices have been shown separated and somewhat spaced, as usual in so-called "exploded views."

The machine now to be described is provided with a fruit loading tray comprising a downwardly inclined bottom 1 (see FIGURE 3) and side walls W (FIG. 1) extending all-around the said bottom 1 with the exception of the outlet edge 2, where said sides extend beyond said edge, so as to form the converging sides of a trapezoidal upwardly steeply sloping section A of a fruit feed channel 3. At the end of this section A there is a channel extension B which has a very slight upward slope and is rectangular, in plan view.

The channel bottom 3 is V-shaped in cross section (see FIGURE 4) and is provided, parallel to its bottom corner and suitably spaced therefrom, with a side slot 6, through which project the supporting stems 4 of a number of concave rakes 7 attached to suitable links (FIGURE 4) of an endless conveyor chain 5, which is continuously driven by a driving sprocket 10 (FIGURE 3) keyed on a control shaft 12, and mounted by the top or delivery end of the channel 3. At the inlet end the conveyor runs on an idler sprocket 11. The upper run of the chain 5 runs between guides 8—9 (FIGURE 4) having the same slopes as the parts A and B of the channel 3. The channel 3 is provided near its upper end with a trap-like section 13 hinged at 14, an adjoining longitudinally slotted section 15 and at the very end, with a fruit-receiving cup 16.

The rakes, suitably spaced along the chain, are thus caused to come upright at the lower end of channel 3, to engage fruit coming off the tray edge 2 (FIGURE 3) and drag the fruit along the entire channel until, in proximity of the trap door 13, the rakes, being swung downwardly when the corresponding chain sections pass around sprocket 10, throw the fruit along the top end sections 13 and 15 into the cup 16. The rakes pass through the trap door 13, while the rake teeth pass through the slots of section 15 (FIGURE 5) as the links 5 move into the lower chain run.

Figure 10:
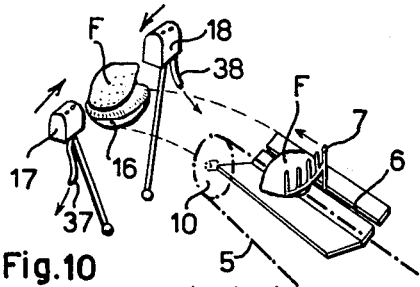
FIGURES 10 to 17 show diagrammatically the operations to which a fruit is subjected from the inlet to the outlet end of the machine.
Figure 11:
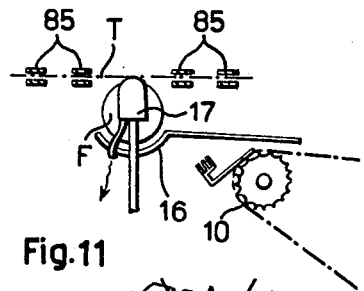

When an individual fruit F is in the cup 16 disposed with its polar axis substantially horizontal, it is seized by a first pair of jaws 17—18 (see FIGURES 1 and 10) in the plane of said axis and then said jaws, which are also provided with suction nozzles connected to suction ducts 37 and 38, are shifted upwardly, while holding a fruit, towards wrapper-supporting members 85 (FIGURES 1 and 11), where the suction nozzles or apertures, with which said jaws are provided, seize by suction a wrapper sheet T and maintain same upon the fruit F gripped between the said jaws 17—18.

Figure 12:
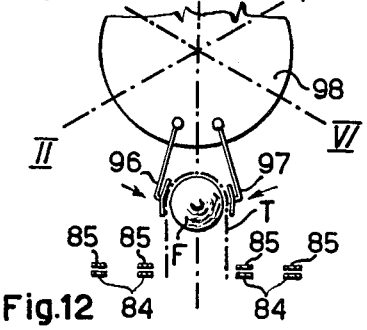

Then the said jaws come at level with a second pair of jaws 96—97 which close in the plane of the polar axis of the fruit, at right angles to the first jaws, upon the partially wrapped fruit within depending laps of the wrapper T (FIGURE 12), whereafter the first jaws open and come back to their lower position (FIGURE 1) ready to take another fruit from the cup 16.

Figure 13:
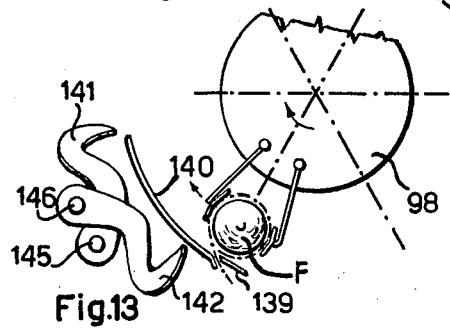
Figure 14:
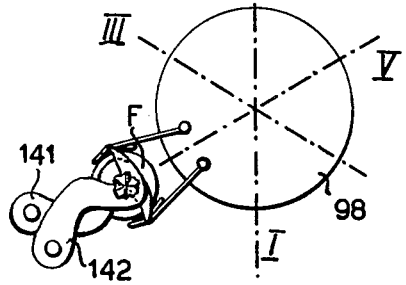
Figure 15:
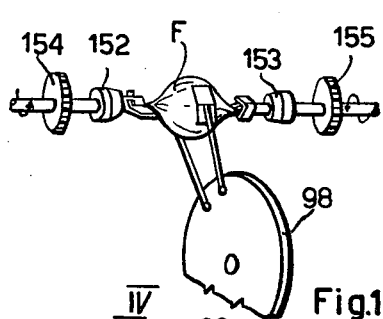
Figure 16:
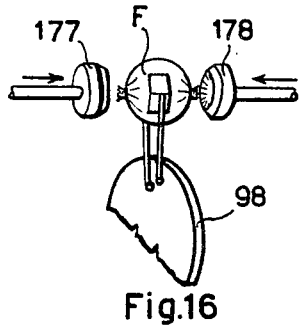
Figure 17:
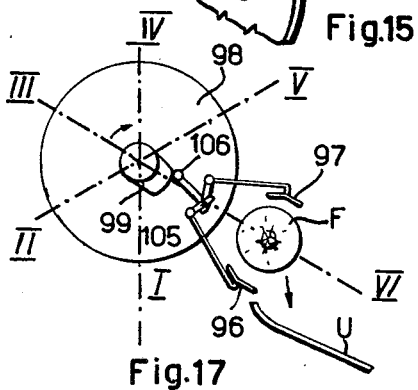

The second pair of jaws forms part of a number of jaw pairs mounted at the periphery of a stepwise revolving disc 98 which stops, after each revolving step, at six stations including a first station in which it seizes the fruit and wrapper. At a second station the second pair of jaws brings the partially wrapped fruit to a wrapper laps-rolling device 139 (FIGURE 13). At a third station the fruit is brought to a wrapper-end crumpling device 141—142 (FIGURES 1 and 14) and then (fourth station) towards a wrapper ends-twisting device 152—153 (FIGURES 1 and 15). Next at the fifth station the fruit is brought between end-sealing means 177—178 (FIGURE 16), and eventually at the sixth or delivery station (FIGURE 17), where the jaws 96—97 are opened and the fruit is allowed to fall into an outlet chute U.

Let us now describe the first pair of jaws and wrapper-seizing means:

As said, the fruit is seized from within the cup 16 by a first pair of jaws.

The jaws 17 and 18 of this first pair are fastened to the top ends of angle levers 19 and 20 (FIG. 6) which are fulcrumed on pivots 21 and 22 and project from a slide 23. The slide 23 is slidably mounted on columns 24 and 25 fastened to the machine frame C. Upon the slide 23 an angle lever 27 is fulcrumed at 26. Said lever 27 has at its upper end a pin 28 passing through slots 29 and 30 provided at the tail ends of said levers 19 and 20.

The lower end of lever 27 carries a roller 32 which rolls upon the edge 33 of a slide 34. This slide has inclined guide slots 51—52 slidable on pins 53—54 fastened to the machine frame. Said slide 34 is reciprocated askance through bell-crank-lever 48 and connecting rod 47 and, when reciprocated, it rocks the lever 27 and through the pin-and-slots transmissions draws the jaws 17—18 apart or allows same to come to a closed position under the pull of torsion springs 35 and 36.

The jaws 17 and 18 are hollow and are provided with suction ports 39 and 40 connected to a source of suction (not shown) by means of ducts 37 and 38, so as to be able to seize and hold a wrapper sheet T.

The vertical shiftings of the slide 23 are obtained by means of the grooved cam 41 which, through pivoted lever 42, drives the connecting rod 45 mounted between the lever end 44 and the pin 46 fastened to the slide.

The wrapper-severing and feed device will be now described:

The wrappers T are severed from a band N which is unrolled from a roll R (FIGURE 7) and is led over an idle roller 55 and under an excentric sector 56 bearing by gravity against the band N to avoid possible back slippings thereof. Thereafter, the band is led over an idle roller 57 and then over the roller 58 which drives same stepwise towards the wrapper-severing device.

This stepwise movement of roller 58 is obtained by fixing the roller to a gear 60 (FIG. 8) and by connecting the latter to rocking shaft 61 by means of a freewheel or anti-regressing clutch 62. The band N is further pressed against the driving roller 58 by a pressure roller 66, mounted on a balance lever 67 fulcrumed at 68 and which is rocked by a tappet rod 69 driven by a cam 70.

Upon the shaft 71 of roller 58, also a sprocket 71 is keyed which, by means of the chain 72, drives a slightly smaller sprocket 73 solidary of roller 74. The number of teeth of the sprocket 73 is less than that of sprocket 71, so that the peripheral speed of roller 74 is slightly greater than that of roller 58. Consequently the severed wrapper section T is driven at higher speed than the remaining band and thus it outstrips the said band.

The band severing device comprises a fixed blade 75 (FIGURE 8) fastened to frame member 76 as by bolts 77 and a movable blade 78 fastened by means of bolts 79 to the end of a balance lever 80 fulcrumed at 68 and rocked by a cam 82 through connecting rod 81. Cam 82, crank 65 and cam 70 are keyed onto shaft 83 driven by the main shaft (FIGURE 9).

After the cutting (FIGURE 7), the band section T is seized between the pair of conveyor belts, comprising belt 84 (shown by dash lines) which is driven by roller 74 and idle belt 85 (shown by dotted lines) and is frictionally carried along by the first belt 84. In fact, before passing above roller 86, the band 84 is led upon the tensioning rollers 87, 88, 89 while the band 85, which is led upon the roller 90 which lies opposite and in contact with roller 74, is led upon the tensioning rollers 91 and 89 and upon this latter roller it overlies band 85 and carries same along with it, as shown in FIGURE 7.

Figure 8:
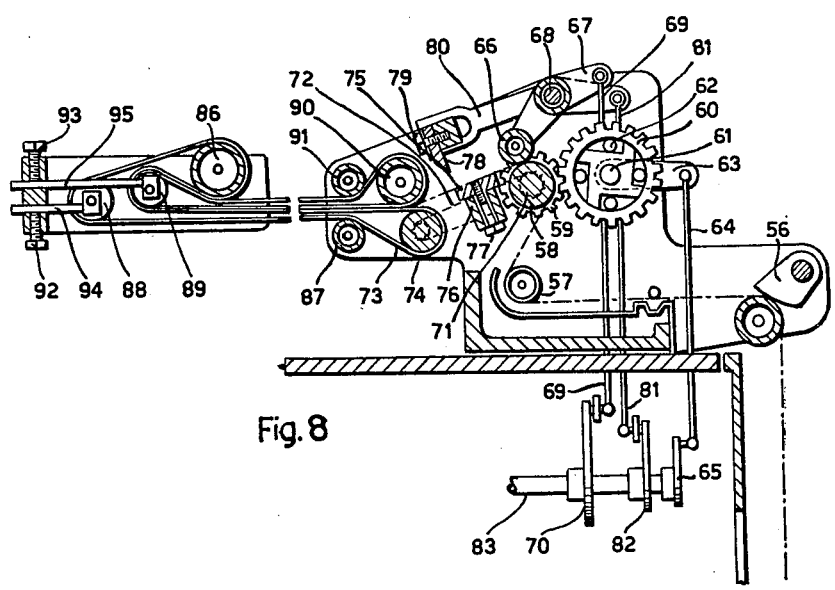
FIGURE 8 represents in longitudinal vertical section a constructive form of the device shown in FIGURE 7.
Figure 9:
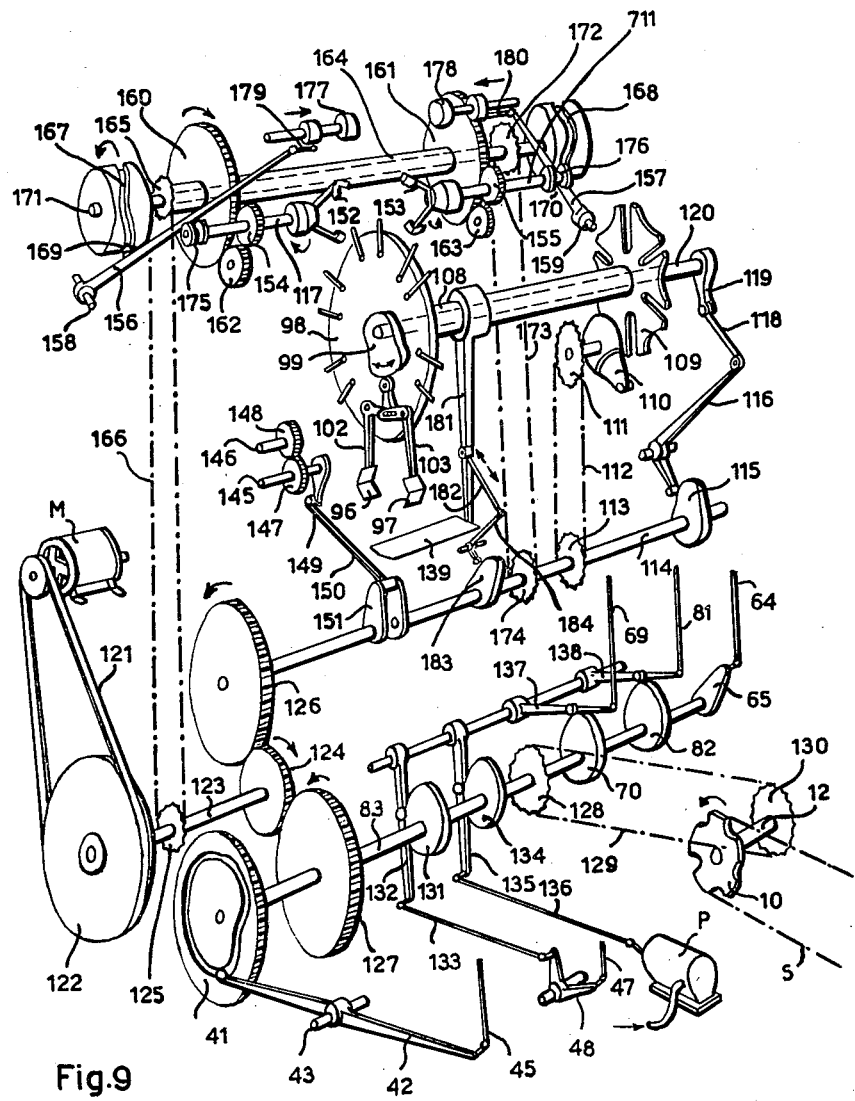
FIGURE 9 shows diagrammatically the synchronised driving arrangement of the operating devices.

The tension of the bands 84 and 85 is adjusted separately by setting in correct position by means of set screws 92 and 93 the bars 94 and 95 to which the bearings of the tensioning rollers 88 and 89 are fastened (FIGURE 8).

Let us now describe the unit carrying the second jaw pairs and the controlling means therefor:

As previously stated, the fruits are transferred, together with a wrapper sheet, from jaws 17—18 to one of the jaw pairs 96—97.

The last named six jaw pairs 96—97 are fitted at the outer ends of angle levers 102—103 (FIG. 2) fulcrumed on pins 100—101 arranged at the periphery of disc 98. The inner ends of said levers 102—103 are connected together by means of a slot-and-pin connection 104—107 which permit the swinging together or apart of the jaws 96—97 which are urged to closed position by spring means 43 and may be opened by action of a cam 99 arranged at the center of disc 98 and acting on the roller 106 of a tail extension 105 of each of the levers 102. The disc 98 is fastened at the end of a hollow shaft 108 (FIG. 9) carrying at its opposite end a six-lobe Maltese gear 109, while the cam 99 is fitted at one end of shaft 120, co-axial of hollow shaft 108.

Both shafts 108 and 120 are driven by the same control shaft 114, shaft 108 being driven through chain drive 113, 112, 111 and the pawl 110 which drives the Maltese gear 109, while the shaft 120 is rocked through cam 115, bellcrank lever 116, connecting rod 118 and crank arm 119.

Thus the disc 98 and cam 99 are driven in synchronism so that when one of the six jaw pairs 96—97 comes in fruit-seizing position, the cam 99 is rocked first to jaw-opening position (FIGURES 1, 2) and then to jaw-closing position, viz., first with a projecting part and then with a depressed or circular part in engaging lever roller 106. This is the first working station (see also FIGURES 12 and 17). When, subsequently, the disc 98 is rotated by one step, viz. through an angle of 60°, and during three subsequent 60°-steps, the roller 106 rolls upon the depressed part of cam 99 and the jaw pair under consideration is closed upon the wrapped fruit which is brought to subsequent wrapping stations II to V (FIGURES 13 to 16). At the VI station (FIGURE 17) the roller comes again into engagement with the projecting cam part and thus the corresponding jaws 96—97 are opened and the wrapped fruit may fall into chute U.

At station I the partially wrapped fruit meets a rocking wrapping member 139 which pushes a wrapped lap into contact with the fruit (FIGURE 13) and a fixed wrapping member 140 which urges the opposite wrapper lap against the oncoming fruit.

The synchronism of the rocking member 139 with the disc 98 is obtained by causing said member 139 to be rocked by the same shaft 114 which drives said disc, the rocking being effected by a cam 183 (FIG. 9) which through a lever 184 and a connecting rod 182 rocks a swinging arm 181 pivotally suspended from hollow shaft 108.

At station III the wrapper ends are subjected to the action of a pair of crumplers (FIGURES 1 and 14) which crumple the two wrapper ends. The crumplers are formed by hook-shaped intermeshing blades 141, 143 and 142, 144 keyed on shafts 145, 146 respectively. The shafts 145, 146 are coupled together by the gear pair 147, 148 (FIG. 9) which are rocked by a crank 151 through connecting rod 150 and crank 149.

At station IV the crumpled wrapper ends are gripped by the twisting devices 152 and 153 (FIGURES 1, 9 and 15) whose jaws are opened and closed by levers 156 and 157 fulcrumed at 158 and 159 and rocked by the grooved cams 167, 168 through engagement with rollers 169 (only one of which is shown in FIGURE 9). The rollers 169 are carried by lever arms 156 and 157, which pull the shafts 117 and 711 outwardly by means of the end joints 175 and 176.

The grooved cams 167, 168 are keyed on a shaft 171 driven by shaft 114 through chain drive 174, 173, 172.

The same twisting devices are rotated in synchronism with the closure of the jaws by the gears 154, 155 which by the jaw-closing operation, are shifted so as to mesh with gears 162 and 161 which in their turn mesh with the toothed wheels 160, 161 keyed on hollow shaft 164 and which is driven through chain drive 125, 166, 165 by shaft 123 (FIGURE 9).

At station V the twisted wrapper ends are subjected to the action of pressing devices 177 and 178 which are rotated by toothed wheels 160 and 161 and pressed against the twisted ends of the wrapper by connecting links 179 and 180 attached to the ends of lever arms 156 and 157.

At the last or VI station (FIGURE 17) the roller 106 strikes against the projecting part of the cam 99 and consequently the jaws 96—97 are driven apart and the fruit is dropped into chute U.

The synchronism of the just described operations is obtained by using a single motor.

FIGURE 9 shows how all elements of the wrapping machine are driven in synchronism by two main shafts, 83 and 114, which are rotated by a single motor M through belt 121, pulley 122, countershaft 123 and gear pairs 124, 126 and 124, 127.

From the shaft 83 through a chain transmission 128, 129 and 130 the shaft 12, which carries the driving wheel 10 of the conveyor chain 5, is controlled.

On the shaft 83 is keyed a cam 134 which, through the rocking arm 135 and the connecting rod 136, drives a suction pump P connected to ducts 37 and 38 of jaws 17 and 18.

On the shaft 83 is keyed another cam 70 which, through rocking arm 137 and connecting rod 69 causes the roller 66 on which is led the paper band N (FIGURES 7 and 8) to come into contact with, or clear of, roller 58.

A further cam 82 on the shaft 83 rocks the arm 138 which, through connecting rod 81, controls the wrapper-severing blade 78. The crank 65 on the same shaft 83, through connecting rod 64 and arm 63 (FIGURE 8) rocks the shaft 61 and thus, due to freewheel coupling 62 drives stepwise in a single direction the gear 59 and roller 58.

The means for controlling the timed operation of the wrapping devices from the other main shaft 114 have been already described and need not be repeated.

Other constructive details have not been described or shown as they are apparent to those skilled in the art.

Of course the device may undergo numerous changes within the limits of the invention as defined by the foregoing specification and set out in the appended claims.

I claim:
1. An automatic fruit-wrapping machine for substantially round fruits comprising a fixed support member for holding a fruit with its polar axis substantially horizontal in a fruit-seizing position, a first pair of jaws and means for closing same upon the poles of said fruit at said fruit-seizing position, a pair of spaced wrapper-feeding and supporting means arranged above and extending laterally of said first pair of jaws, suction means on the upper sides of said jaws, a second pair of jaws arranged above said wrapper-supporting means and closeable horizontally about a fruit in a direction at right angles to the poles of the fruit, means for shifting said first pair of jaws upwardly across the wrapper-supporting means and to the level of said second pair of jaws so that the wrapper is adhered by said suction means to the tops of said first pair of jaws and against the top of the fruit clamped therebetween thus partially wrapping the fruit with the wrapper hanging down along two sides of the fruit, means for closing said second pair of jaws upon the fruit and wrapper thereon, means for opening the said first pair of jaws to release the fruit, means for withdrawing said first pair of jaws downwardly to said fruit-seizing position, means for shifting said second pair of jaws step by step with a fruit and wrapper clamped therebetween through a number of processing stations, and means for opening said second pair of jaws at a position past the last processing station.

2. An automatic wrapping machine according to claim 1 comprising further a substantially trapezoidal tray-like member for conveying fruits to said support member, said tray-like member having a downwardly inclined bottom wall and upstanding side walls, a substantially V-shaped channel for receiving the fruits rolling down from said bottom wall, said channel extending from below the bottom wall of said tray-like member to said support member, and fruit-engaging means movable along said channel to push said fruits to said support member.

3. An automatic wrapping machine according to claim 2 in which the said channel comprises a first section of substantially trapezoidal shape and steeply inclined upwardly and a second section of substantially rectangular shape and terminating at said support member, a slot in said channel extending parallel to the central edge at the deepest part of the V-shape of the channel and said fruit-engaging means having stems extending through said slot, an endless conveyor mounted on sprocket wheels and having an upper run parallel to said channel, means for driving at least one of said sprocket wheels, said conveyor carrying the lower ends of said stems at spaced intervals, and means on said channel near the said support member for permitting the fruit-engaging means to pass from above said channel to the lower run of the conveyor.

4. An automatic wrapping machine according to claim 1, in which said fruit-engaging means are rakes whose teeth extend from arcuate bars fastened to said stems.

5. An automatic wrapping machine for substantially round fruits comprising a support member for holding a fruit in a fruit-seizing position, a first pair of jaws for taking fruits one by one from said support member and a second pair of jaws operating substantially at right angles with respect to the first pair of jaws, means for reciprocating the first pair of jaws to carry a fruit toward said second pair of jaws and then withdraw, suction means on said first pair of jaws, means for supporting a wrapper in the path of movement of said first pair of jaws toward the second pair of jaws, means for closing said second pair of jaws upon the wrapper and fruit held by the said first pair of jaws, means for moving the second pair of jaws step by step with the fruit and wrapper gripped therebetween through a number of wrapping stations, and means for opening said second pair of jaws after the last wrapping station, said means for reciprocating the first pair of jaws including a slide, hinge means on said slide, means for opening and closing said first pair of jaws about said hinge means to grasp a fruit on said support member in the fruit-seizing position, and means for shifting said slide from an initial position aligning the first pair of jaws with a fruit in the fruit-seizing position to a second position aligning the first pair of jaws with said second pair of jaws, said second pair of jaws being provided with a cam for opening the jaws and permitting said first pair of jaws to insert the fruit and wrapper therebetween, said means for opening said first pair of jaws operating at the beginning of the return movement of said slide for carrying the first pair of jaws back into alignment with said fruit-seizing position, and said machine being further provided with means to feed another fruit to said support member during the time in which said first pair of jaws is reciprocated toward and away from said second pair of jaws.

6. A wrapping machine according to claim 5 wherein is further provided a rotatable disc, a plurality of said second pairs of jaws hinged to the periphery of said disc at regularly spaced intervals, spring means for urging each of said pairs of jaws to their closed position, a cam having a projecting section arranged at the centre of said disc, a member projecting from each of said second pairs of jaws towards said cam and coacting with said projecting cam section to open the corresponding pair of jaws, driving means for said disc including a Maltese gear having a number of lobes equal to the number of said pairs of second jaws to intermittently turn said disc step by step so as to complete one revolution after a number of steps corresponding to the number of lobes of the Maltese gear, each of said steps corresponding to a working station, and means for rocking said cam to open each pair of jaws upon arrival at the first working station in timed relation with the movement thereto of the first pair of jaws carrying a fruit and after arrival at the last working station to release a fruit.

7. A wrapping machine according to claim 6 wherein after the first working station, at which the wrapper is gripped by a second pair of jaws, is provided means between the first and second working stations for rolling the wrapper around the fruit, said wrapper-rolling means including a fixed plate and a swinging plate each acting on a wrapper lap.

8. A wrapping machine according to claim 7 in which, at a third working station, means is provided for crumpling the wrapper ends, said means including a pair of hook-shaped jaws which may be clamped about the projecting ends of the wrapper rolled about the fruit.

9. A wrapping machine according to claim 8 in which, at a fourth working station, means is provided for seizing and twisting the wrapper ends crumpled at the preceding station, said seizing and twisting means including two facing pairs of pincers arranged on rotatable heads having gears secured thereto, cam-controlled means for opening and closing said pincers when said heads are stopped and cam-controlled clutch means for connecting said gears with revolving drive gears after the closure of said pincers, said clutch means operating to disconnect said gears after the twisting of a wrapper is completed.

10. A wrapping machine according to claim 9 in which, at a fifth working station, is further provided a pair of revolving pressure means, means for moving said pressure means against the twisted wrapper ends and the fruit held therebetween, and means for drawing said pressure means apart before the said disc is advanced another step.

11. A wrapping machine according to claim 10 in which, at a sixth and last working station, said means for rocking the cam is operated so as to open the second pair of jaws and release the fully wrapped fruit.

12. A wrapping machine according to claim 11 in which all the said movable members and means are controlled in timed relation and driven by a single motor through two parallel shafts receiving their movement from a third shaft connected to the motor by a speed reduction transmission, said third shaft being connected further by a chain drive to means for rotating the twisting pairs of pincers and the pressure means drawn against twisted wrapper ends of a fruit at the said fourth and fifth working stations respectively.

13. A fruit-wrapping machine according to claim 1 in which the said wrapper-supporting means forms part of a complementary device including means for feeding a band of wrapping material, means for cutting said band into sections, each of which constitutes a wrapper, and means for separating the wrapper from the band and from each other and for feeding the wrapper separately to said wrapper-supporting means.

14. A fruit-wrapping machine comprising means for taking fruits singly from a bulk supply and conveying each fruit in turn to a fruit-holding cup, a first pair of jaws for gripping a fruit in said cup and taking the fruit from the cup to a second pair of jaws, a wrapper sheet on a wrapper support and interposed in the path of movement of said first pair of jaws, means for severing wrapper sheets from a band of wrapper material and forwarding the sheets individually to said wrapper support means, suction means on said first pair of jaws adapted to grasp said wrapper sheet during movement of the first pair of jaws toward the second pair, said second pair of jaws being operative to grip a fruit covered by a wrapper sheet in the same plane as the fruit is gripped by the first pair of jaws but at right angles thereto, means for shifting said second pair of jaws with a fruit and wrapper gripped therebetween step by step to a wrapper rolling station, a wrapper ends-crumpling station, a crumpled wrapper ends-twisting station, a twisted wrapper ends-sealing station, and means for opening the second pair of jaws after said last named station.

References Cited in the file of this patent

UNITED STATES PATENTS

| | | |
|---|---|---|
| 1,271,403 | Williams | July 2, 1918 |
| 2,744,370 | Seragnoli | May 8, 1956 |
| 2,875,567 | Brook | Mar. 3, 1959 |
| 2,938,320 | Lesch | May 31, 1960 |